(12) United States Patent
Sun

(10) Patent No.: US 9,351,113 B1
(45) Date of Patent: May 24, 2016

(54) METHODS AND SYSTEMS FOR ADJUSTING LOCATION QUERYING FREQUENCY OF A COMPUTING DEVICE

(71) Applicant: Google Inc., Mountain View, CA (US)

(72) Inventor: Zhentao Sun, Mountain View, CA (US)

(73) Assignee: Google Inc., Mountain View, CA (US)

( * ) Notice: Subject to any disclaimer, the term of this patent is extended or adjusted under 35 U.S.C. 154(b) by 223 days.

(21) Appl. No.: 13/929,997

(22) Filed: Jun. 28, 2013

(51) Int. Cl.
| | |
|---|---|
| *G06Q 30/00* | (2012.01) |
| *H04W 4/02* | (2009.01) |
| *H04L 12/24* | (2006.01) |
| *G01C 21/00* | (2006.01) |
| *G06Q 30/02* | (2012.01) |

(52) U.S. Cl.
CPC ........... *H04W 4/021* (2013.01); *H04L 41/0806* (2013.01); *G01C 21/00* (2013.01); *G06Q 30/0281* (2013.01)

(58) Field of Classification Search
CPC ........ H04W 4/00; H04W 24/00; H04W 64/00
See application file for complete search history.

(56) References Cited

U.S. PATENT DOCUMENTS

| | | | | |
|---|---|---|---|---|
| 7,026,984 | B1* | 4/2006 | Thandu ................... | G01S 19/34 342/357.74 |
| 7,142,979 | B1* | 11/2006 | Shonk ........................... | 701/446 |
| 2002/0028674 | A1* | 3/2002 | Slettengren ........... | H04M 1/663 455/435.1 |
| 2003/0224804 | A1* | 12/2003 | Liu ........................... | 455/456.1 |
| 2004/0132461 | A1* | 7/2004 | Duncan ................. | G01C 21/00 455/456.1 |
| 2004/0219932 | A1* | 11/2004 | Verteuil .................. | H04L 12/14 455/456.2 |
| 2011/0071881 | A1* | 3/2011 | Zheng et al. .................... | 705/10 |

\* cited by examiner

*Primary Examiner* — Oleg Survillo
*Assistant Examiner* — Jihad Boustany
(74) *Attorney, Agent, or Firm* — McDonnell Boehnen Hulbert & Berghoff LLP

(57) ABSTRACT

The present disclosure provides example methods operable by computing device. An example method may include querying a location of a computing device with a first frequency. The method may also include accumulating data on the computing device over a time period. The data may include respective locations of the computing device during the time period with respect to the time of day and at increments based on the first frequency. The method may also include determining a model of the location of the computing device with respect to the time of day based on the accumulated data. The method may also include comparing the current location of the computing device to the model. If the current location of the computing device is consistent with the model, the method may also include querying the location of the computing device with a second frequency.

13 Claims, 6 Drawing Sheets

METHODS AND SYSTEMS FOR ADJUSTING LOCATION QUERYING FREQUENCY OF A COMPUTING DEVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, among many other types of computing devices, are increasingly prevalent in numerous aspects of modern life. Such computing devices can opt to monitor geofences and its location. A geofence is a virtual region specified in relation to a corresponding geographical region. For example, a geofence that encircles at least part of a stadium can be specified with a latitude and longitude pair and a given radius. In other examples, polygons, such as triangles or rectangles, or other shapes can be used to specify a geofence.

An example computing device may receive message(s) when the device enters into a geofence and/or exits a geofence. Some geofences can include other geofences; e.g., the above-mentioned geofence for the United Center can contain geofence(s) for points of interest, offices, facilities, and shops within the United Center geofence, just as the physical United Center can contain physical regions for the aforementioned points of interest, offices, facilities, and shops. Continuing this example, as the device moves into, around, and through the United Center, the device can receive message(s) when entering the United Center geofence, when subsequently entering into geofences within the United Center geofence, and perhaps when leaving the United Center geofence.

SUMMARY

In one embodiment, the present disclosure provides a method. The method may include querying a location of a computing device with a first frequency. The method may also include accumulating data on the computing device over a time period. The data may include respective locations of the computing device during the time period with respect to the time of day and at increments based on the first frequency. The method may also include determining a model of the location of the computing device with respect to the time of day based on the accumulated data. The method may also include comparing the current location of the computing device to the model. If the current location of the computing device is consistent with the model, the method may also include querying the location of the computing device with a second frequency, where the second frequency is less than the first frequency.

In another embodiment, the present disclosure provides a computing device. The computing device may include at least one processor and data storage having program logic executable by the at least one processor to perform functions. The functions may include querying a location of a computing device with a first frequency. The functions may also include accumulating data on the computing device over a time period. The data may include respective locations of the computing device during the time period with respect to the time of day and at increments based on the first frequency. The functions may also include determining a model of the location of the computing device with respect to the time of day based on the accumulated data. The functions may also include comparing the current location of the computing device to the model. If the current location of the computing device is consistent with the model, the functions may also include querying the location of the computing device with a second frequency, where the second frequency is less than the first frequency.

In yet another embodiment, the present disclosure provides a non-transitory computer readable memory having stored thereon that, in response to execution by a computing device, cause the computing device to perform functions. The functions may include querying a location of a computing device with a first frequency. The functions may also include accumulating data on the computing device over a time period. The data may include respective locations of the computing device during the time period with respect to the time of day and at increments based on the first frequency. The functions may also include determining a model of the location of the computing device with respect to the time of day based on the accumulated data. The functions may also include comparing the current location of the computing device to the model. If the current location of the computing device is consistent with the model, the functions may also include querying the location of the computing device with a second frequency, where the second frequency is less than the first frequency.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
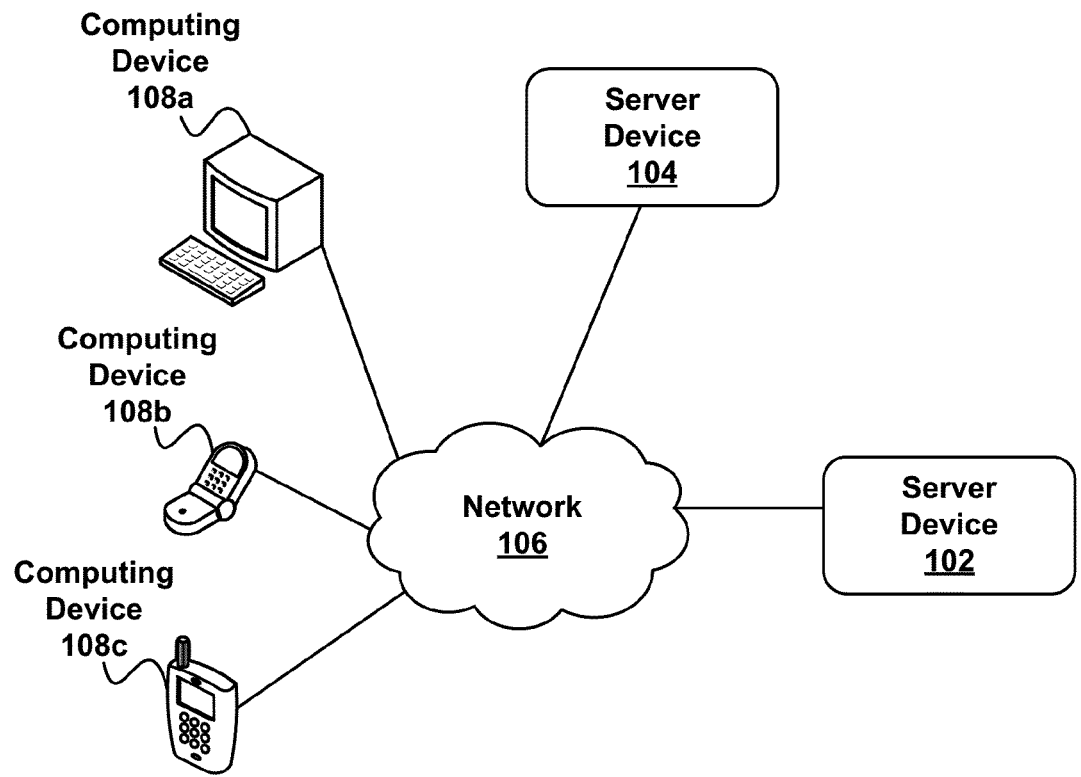
FIG. 1 depicts a distributed computing architecture, in accordance with an example embodiment.

Example methods and systems are described herein. Any embodiment or feature described herein as being an "example" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Computing devices such as personal computers, laptop computers, tablet computers, cellular phones, among many other types of computing devices, are increasingly prevalent in numerous aspects of modern life. Such computing devices can opt to monitor geofences and its location. A geofence is a virtual region specified in relation to a corresponding geographical region. An example computing device may receive message(s) when the computing device enters into a geofence and/or exits a geofence.

The above approach for geofencing involves accurately locating the computing device. Determining a location of the computing device can be accomplished using several techniques. Example techniques for determining the location of the computing device include, but are not limited to: using a Global Positioning System (GPS) receiver in the computing device, input from a user of the computing device, determining the location based on information in the environment (e.g., street and highway signs), triangulation of network signals, use measurements from gyroscope(s) and accelerometer(s), and combinations of these techniques. Other techniques are possible as well. Such location based actions of a computing device may use a significant amount of power. Therefore, it may be desirable to reduce the power drain of computing devices due to location based actions.

Disclosed herein are techniques for reducing power usage of computing devices due to location based actions. In one example, power usage may be reduced by adjusting the frequency at which the location of the computing device is determined based on the activity of a user, which can be inferred by actions or movement of the device. Thus, the activity of a user can be determined and used to better predict when and how often to determine the location of the computing device.

In one example, a model of user activity may be developed during a training period. The training period may be one month, as an example. The model may represent the location of the computing device with respect to the time of day. For example, consider a user who takes his or her computing device everywhere during one working day. From 12:00 am-8:00 am, the computing device is at the residence of the user while the user sleeps. From 8:00 am-9:00 am the location of the computing devices changes as the user commutes to work. From 9:00 am-5:00 pm the computing device is at the user's worksite. From 5:00 pm-6:00 pm, the location of the computing device changes as the user commutes home from work. From 6:00 pm-12 am, the user's activities may vary by day, so the location of the computing device during this time period may be variable.

In another example, the model may include a representation of the movement of the computing device with respect to the time of day. The movement of the computing device with respect to the time of day may be classified into activity classes during the training period. For example, consider a user who takes his or her computing device everywhere during one working day. First, the computing device is essentially stationary at home while the user prepares for his or her workday. Then, as the user travels to work, the computing device is moving to the worksite, either in the possession of the user as the user walks to the worksite, or in a vehicle as the user commutes to the worksite. Depending on the user's tasks, the computing device may then be essentially stationary at an office, walk or run around a job site, and/or travel from place to place in a vehicle. Then, after work, the computing device may be taken home and remain stationary while the user sleeps. In this example, a classification of the activities of the computing device can include: (a) being stationary, (b) walking, (c) running, or (d) vehicular travel. Other activity classes are possible as well.

The computing device may accumulate data during the training period, including the location of the computing device with respect to the time of day and a classification of the activities of the computing device with respect to a time of day. The computing device may then create a model based on the accumulated data. Once the model has been created, the computing device may compare a current location and activity of a user to the model. If the model is consistent with the current location and activity, the computing device may query its location less frequently, thus saving power.

For example, the computing device may typically query its location every 1-2 minutes to see if it is inside or outside of a geofence. However, during the training phase the computing device may accumulate data indicating that the user usually sleeps between 12:00 am and 8:00 am. At that time, the computing device is stationary at the residence of the user. Therefore, the computing device may be configured to reduce the frequency at which it determines its location (for example, every 10-15 minutes) during this time period, if the current location and activity of the computing device is consistent with the model. If the current activity is inconsistent with the model (e.g., the user is out late at night), then the computing device may determine its location every 1-2 minutes until the current activity is consistent with the model.

It should be understood that the above examples of the method are provided for illustrative purposes, and should not be construed as limiting.

II. EXAMPLE SYSTEMS AND COMPUTING DEVICES

FIG. 1 shows server devices 102, 104 configured to communicate, via network 106, with computing devices 108a, 108b, and 108c. Network 106 may correspond to a LAN, a wide area network (WAN), a corporate intranet, the public Internet, or any other type of network configured to provide a communications path between networked computing devices. The network 106 may also correspond to a combination of one or more LANs, WANs, corporate intranets, and/or the public Internet.

Although FIG. 1 only shows three computing devices, distributed application architectures may serve tens, hundreds, or thousands of computing devices. Moreover, computing devices 108a, 108b, and 108c (or any additional computing devices) may be any sort of computing device, such as an ordinary laptop computer, desktop computer, network terminal, wireless communication device (e.g., a cell phone or smart phone), and so on. In some embodiments, computing devices 108a, 108b, and 108c may be dedicated to the design and use of software applications. In other embodiments, computing devices 108a, 108b, and 108c may be general purpose computers that are configured to perform a number of tasks and need not be dedicated to software development tools. In still other embodiments, computing devices 108a, 108b, and/or 108c can be configured to perform some or all of the herein-described functionality of a computing device.

Server devices 102, 104 can be configured to perform one or more services, as requested by computing devices 108a, 108b, and/or 108c. For example, server device 102 and/or 104 can provide content to computing devices 108a-108c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 102 and/or 104 can provide computing devices 108a-108c with access to software for database, search, computation, graphical, audio, video, World Wide Web/Internet utilization, and/or other functions. Many other examples of server devices are possible as well.

Figure 2:
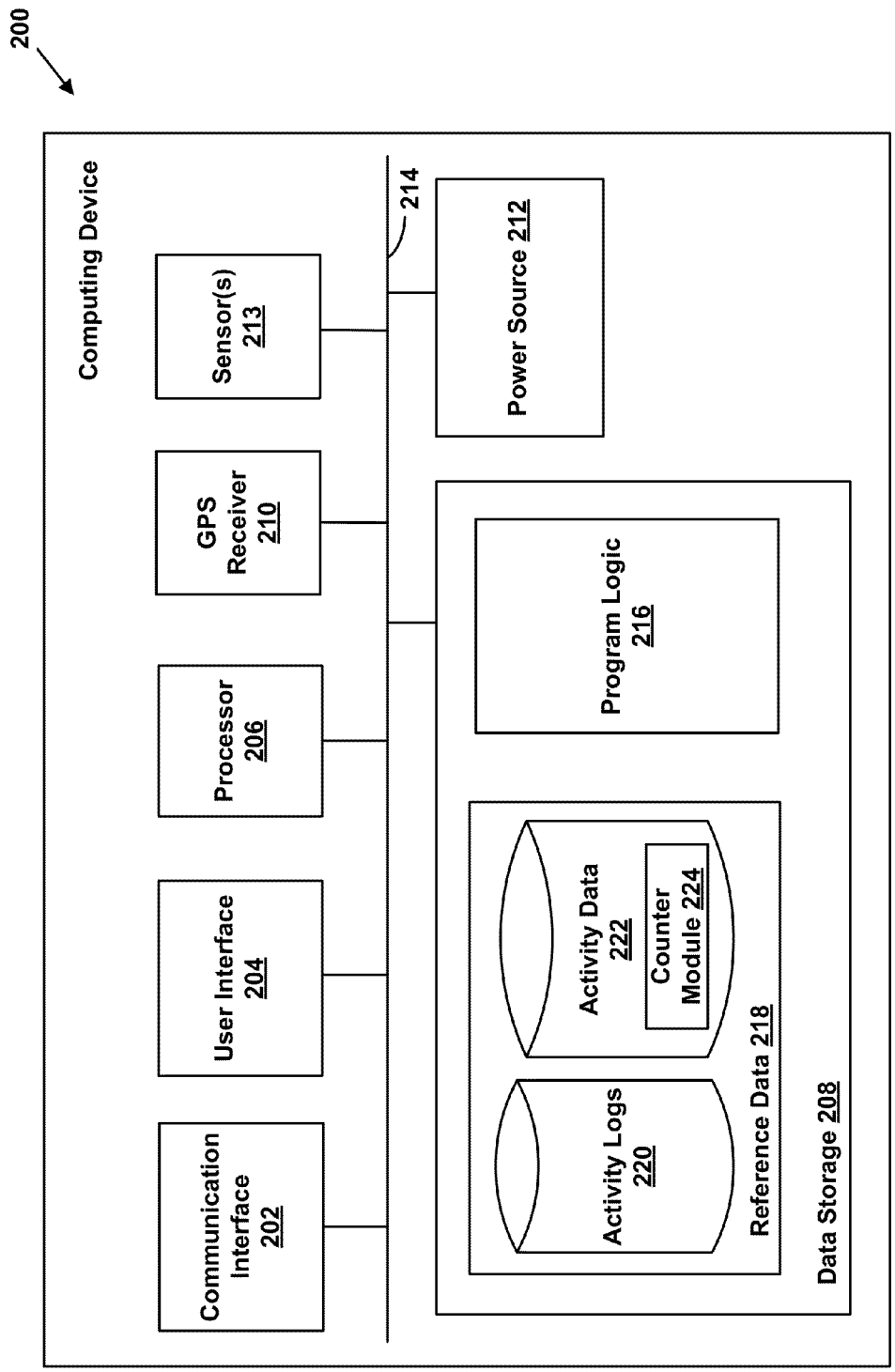
FIG. 2 is a simplified block diagram showing some of the components of an example computing device, in accordance with an example embodiment.

FIG. 2 is a simplified block diagram showing some of the components of an example computing device 200. In some embodiments, some components illustrated in FIG. 2 may be distributed across multiple computing devices. However, for the sake of example, the components are shown and described as part of one example computing device 200. By way of example and without limitation, computing device 200 may be a cellular mobile telephone (e.g., a smartphone), mobile device, desktop computer, email/messaging device, tablet computer, or similar device that may be configured to perform the functions described herein.

The computing device 200 may include a communication interface 202, a user interface 204, a processor 206, data storage 208, a GPS receiver 210, a power source 212, and sensors 213. All of the components illustrated in FIG. 2 may be linked together by a communication link 214. The computing device 200 may also include hardware to enable communication within the computing device 200 and between the computing device 200 and another computing device (not shown), such as a server entity. The hardware may include transmitters, receivers, and antennas, for example.

The communication link 214 is illustrated as a wired connection; however, wireless connections may also be used. For example, the communication link 214 may be a wired serial bus such as a universal serial bus or a parallel bus. A wired connection may be a proprietary connection as well. The communication link 214 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. One or more remote computing devices may be accessible via the Internet and may include a computing cluster associated with a particular web service (e.g., social-networking, photo sharing, address book, etc.).

The communication interface 202 may allow the computing device 200 to communicate with another computing device (not shown), such as a server. Thus, the communication interface 202 may be configured to receive input data from one or more computing devices, and may also be configured to send output data to the one or more computing devices. In some examples, the communication interface 202 may also maintain and manage records of data received and sent by the computing device 200. In other examples, records of data may be maintained and managed by other components of the computing device 200.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a short range wireless interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program logic 216 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program logic 216 by processor 206 may result in processor 206 using reference data 218.

The reference data 218 may include activity logs 220 received from the processor 206, and activity data 222 determined based on comparisons made between stored activity logs 220. In another example, activity data 222 may be determined based on data from one or more sensors 213 or may be computed in the processor 206 based on readings from the one or more sensors 213. The activity data 222 may include a counter module 224. The counter module 224 may include a counter value indicative of a number of occurrences of a correlation between an input received from the computing device 200 and previously stored inputs. The counter module 224 may be configured to increment the counter value based at least in part on the number of occurrences. In some examples, one or more functions of the computing device 200 may be adjusted when the counter value is less than, or exceeding, a threshold. Other activity data is possible as well, as discussed below in reference to later figures.

GPS receiver 210 may be any known or hereafter-developed GPS receiver, suitable for receiving and decoding GPS signals for location and timing purposes, perhaps among other purposes. Power source 212 may be a battery that provides power to support operation of the computing device 200 when the computing device 200 is not connected with another power source. Power source 212 may be rechargeable and may take various forms, examples of which include nickel metal hydride (NiMH), nickel cadmium (NiCd), Lithium Ion (Li-Ion), and lithium polymer (Li-Poly), or any other form now known or later developed. Sensors 213 may include one or more of proximity sensors, accelerometers, gyroscopes, and magnetometers.

Figure 3:
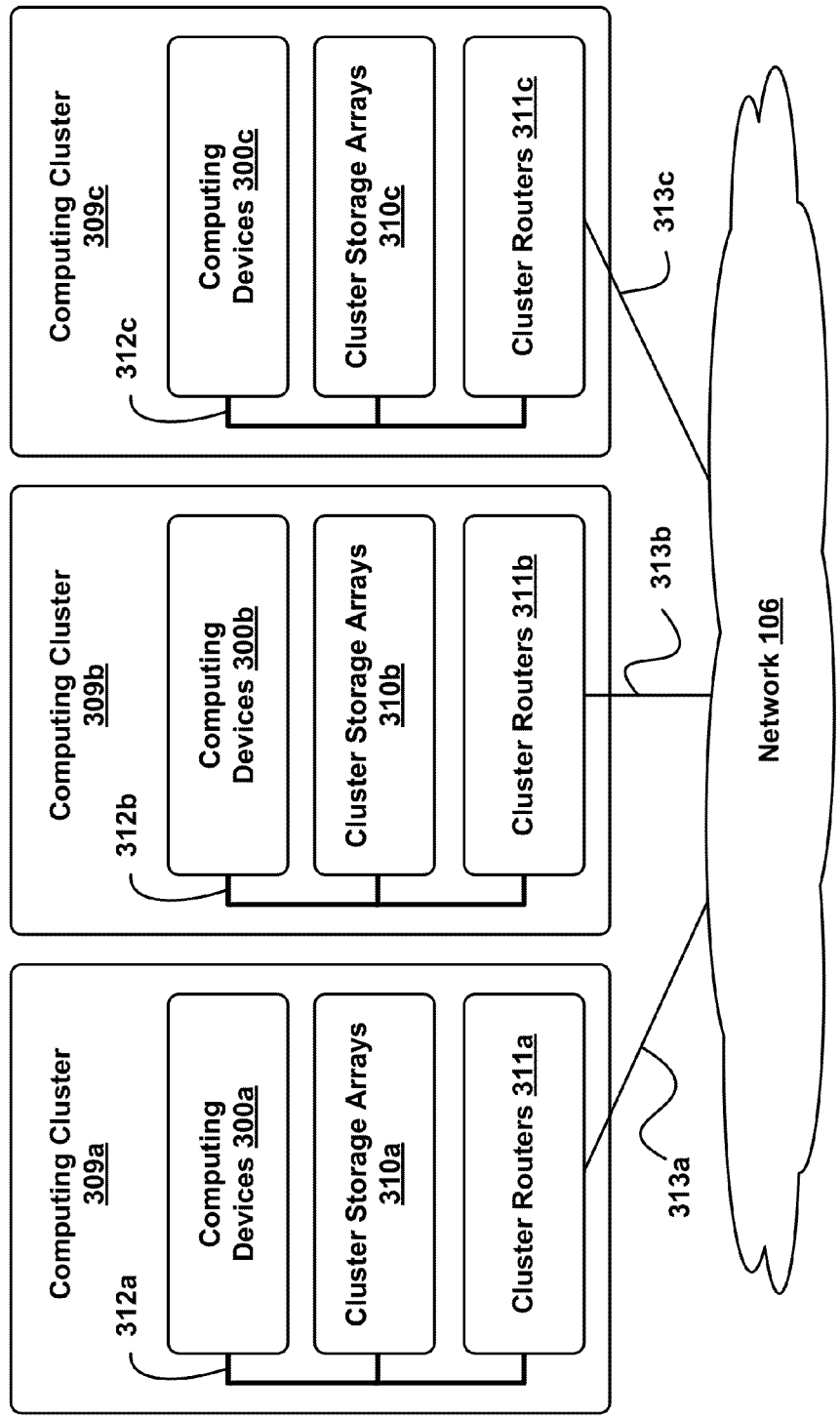
FIG. 3 depicts a cloud-based server system, in accordance with an example embodiment.

FIG. 3 depicts a network 106 of computing clusters 309a, 309b, 309c arranged as a cloud-based server system in accordance with an example embodiment. Server devices 102 and/or 104 can be cloud-based devices that store program logic and/or data of cloud-based applications and/or services. In some embodiments, server devices 102 and/or 104 can be a single computing device residing in a single computing center. In other embodiments, server device 102 and/or 104 can include multiple computing devices in a single computing center, or even multiple computing devices located in multiple computing centers located in diverse geographic locations. For example, FIG. 3 depicts each of server devices 102 and 104 residing in different physical locations.

In some embodiments, data and services at server devices 102 and/or 104 can be encoded as computer readable information stored in non-transitory, tangible computer readable media (or computer readable storage media) and accessible by computing devices 108a, 108b, and 108c, and/or other computing devices. In some embodiments, data at server device 102 and/or 104 can be stored on a single disk drive or other tangible storage media, or can be implemented on multiple disk drives or other tangible storage media located at one or more diverse geographic locations.

FIG. 3 depicts a cloud-based server system in accordance with an example embodiment. In FIG. 3, the functions of server device 308 and/or 310 can be distributed among three computing clusters 309a, 309b, and 309c. Computing cluster 309a can include one or more computing devices 300a, cluster storage arrays 310a, and cluster routers 311a connected by a local cluster network 312a. Similarly, computing cluster 309b can include one or more computing devices 300b, cluster storage arrays 310b, and cluster routers 311b connected by a local cluster network 312b. Likewise, computing cluster 309c can include one or more computing devices 300c, cluster storage arrays 310c, and cluster routers 311c connected by a local cluster network 312c.

In some embodiments, each of the computing clusters 309a, 309b, and 309c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 309a, for example, computing devices 300a can be configured to perform various computing tasks of an electronic communications server. In one embodiment, the various functionalities of the electronic communications server can be distributed among one or more of computing devices 300a, 300b, and 300c. Computing devices 300b and 300c in computing clusters 309b and 309c can be configured similarly to computing devices 300a in computing cluster 309a. On the other hand, in some embodiments, computing devices 300a, 300b, and 300c can be configured to perform different functions.

In some embodiments, computing tasks and stored data associated with server devices 102 and/or 104 can be distributed across computing devices 300a, 300b, and 300c based at least in part on the processing requirements of server devices 102 and/or 104, the processing capabilities of computing devices 300a, 300b, and 300c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 310a, 310b, and 310c of the computing clusters 309a, 309b, and 309c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 102 and/or 104 can be distributed across computing devices 300a, 300b, and 300c of computing clusters 309a, 309b, and 309c, various active portions and/or backup portions of these components can be distributed across cluster storage arrays 310a, 310b, and 310c. For example, some cluster storage arrays can be configured to store the data of server device 102, while other cluster storage arrays can store data of server device 104. Additionally, some cluster storage arrays can be configured to store backup versions of data stored in other cluster storage arrays.

The cluster routers 311a, 311b, and 311c in computing clusters 309a, 309b, and 309c can include networking equipment configured to provide internal and external communications for the computing clusters. For example, the cluster routers 311a in computing cluster 309a can include one or more internet switching and routing devices configured to provide (i) local area network communications between the computing devices 300a and the cluster storage arrays 301a via the local cluster network 312a, and (ii) wide area network communications between the computing cluster 309a and the computing clusters 309b and 309c via the wide area network connection 313a to network 106. Cluster routers 311b and 311c can include network equipment similar to the cluster routers 311a, and cluster routers 311b and 311c can perform similar networking functions for computing clusters 309b and 309c that cluster routers 311a perform for computing cluster 309a.

In some embodiments, the configuration of the cluster routers 311a, 311b, and 311c can be based at least in part on the data communication requirements of the computing devices and cluster storage arrays, the data communications capabilities of the network equipment in the cluster routers 311a, 311b, and 311c, the latency and throughput of local networks 312a, 312b, 312c, the latency, throughput, and cost of wide area network links 313a, 313b, and 313c, and/or other factors that can contribute to the cost, speed, fault-tolerance, resiliency, efficiency and/or other design goals of the moderation system architecture.

III. EXAMPLE GEOFENCES

Figure 4A:
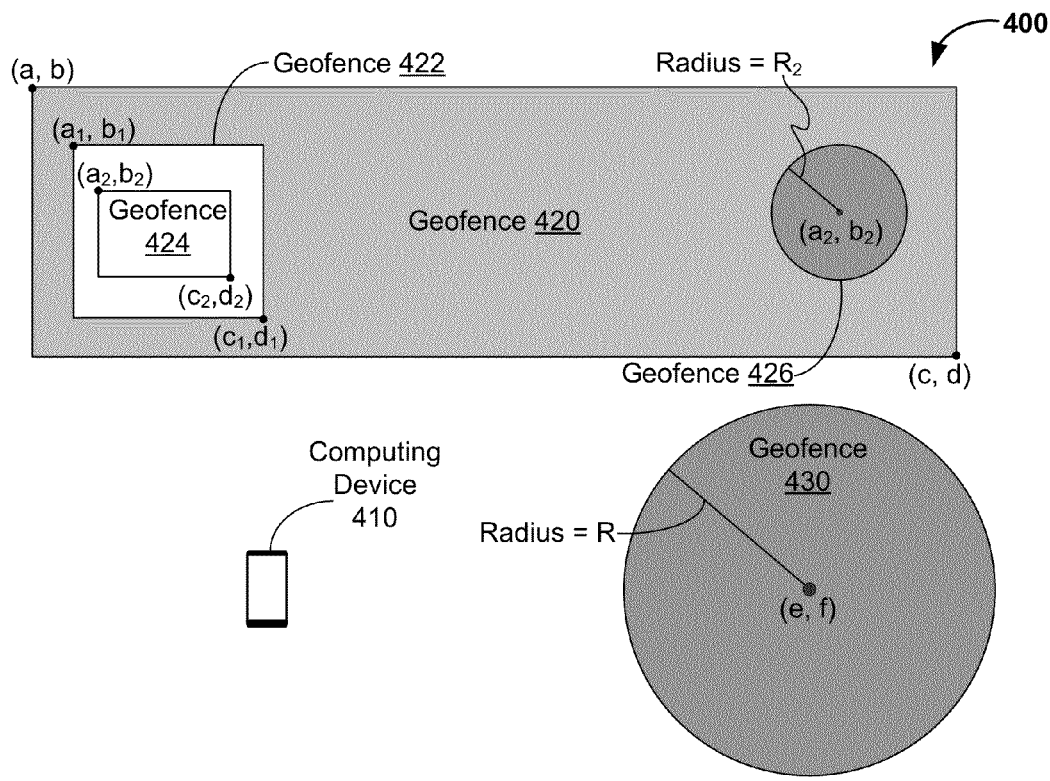
FIG. 4A depicts a geofencing scenario for a computing device, in accordance with an example embodiment.

FIG. 4A depicts a geofencing scenario 400 for a computing device 410, in accordance with an example embodiment. In FIG. 4A, computing device 410 is relatively close to five geofences: geofences 420, 422, 424, 426, and 430. Geofences 420, 422, and 424 are shaped as rectangles, and specified in terms of upper-left-hand corner and lower-left-hand corner coordinates. For example, geofence 420 has upper-left-hand corner coordinates of (a, b) and lower-left-hand corner coordinates of (c, d). By this specification, geofence 420 includes all points whose x coordinates range from a to c and whose y coordinates range from b to d.

In some cases, geofences can be nested or included within other geofences. For example, FIG. 4A shows geofences 422 and 426 within geofence 420, and geofence 424 within geofence 422.

Other geometries than rectangles can be used for geofences. FIG. 4A shows circular geofences 426 and 430 each specified by a respective center point and radius. For examples, geofence 426 is specified with a center point of $(a_2, b_2)$ and a radius of $R_2$, and geofence 430 is specified with a center point of (e, f) and a radius of R.

Figure 4B:
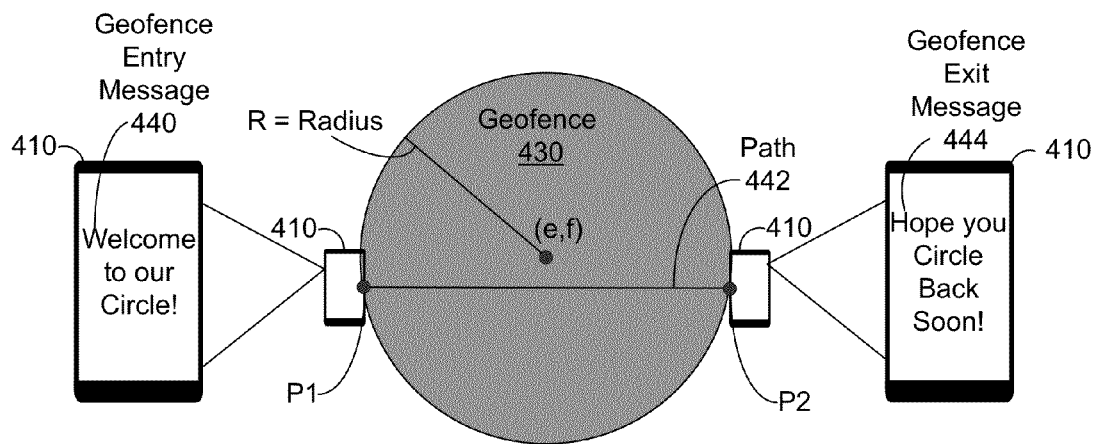
FIG. 4B depicts a geofencing scenario for a computing device, in accordance with an example embodiment.

FIG. 4B depicts an example geofencing scenario. In FIG. 4B, computing device 410 enters geofence 430 at point P1, travels along path 442, and exits geofence 430 at point P2. Computing device 410 can first determine entry within geofence 430 by determining its current location, determining a difference D between the current location and the center point (e, f) of geofence 430, and comparing the difference D to a function f(R) of the radius R of geofence 430.

For example, let (x, y) be the current position of computing device 410. Then, if the difference D between the current position and the center point of geofence 430 is determined as $$D = \sqrt{(x-e)^2 + (y-f)^2},$$

then the difference D can be compared to the radius R of geofence 430; i.e., f(R)=R. In another example, the difference D can be determined as $D=(x-e)^2+(y-f)^2$ with $f(R)=R^2$.

Then, if D is less than f(R), computing device 410 is within the boundary of geofence 430; otherwise, D≥f(R) and computing device 410 is not within the boundary of geofence 430.

To determine entry into the geofence, computing device 410 can retain two values for each geofence: a previous entry state and a current entry state. The previous and current entry states can both be initialized to "Not entered". Then, computing device 410 can determine whether it is within geofence 430 using the techniques mentioned above. If computing device 410 is now within geofence 430; e.g., has reached point P1 along path 442; then the current entry state can be set to "Entered". Upon setting the current entry state to "Entered", computing device 410 can determine whether the previous entry state is set to "Not entered". When the current entry state is "Entered" and the previous entry state is set to "Not entered", then computing device 410 can determine that computing device 410 has just entered into geofence 430. After comparing the previous entry state with "Not entered", the current entry state can be copied to the previous entry state.

Upon entry into geofence 430, a geofence entry message can be generated. FIG. 4B shows that computing device 410 enters geofence 430 at point P1 and so geofence entry message 440 of "Welcome to our Circle!" is generated for display on computing device 410.

A similar technique can be used to determine when computing device 410 exits geofence 430; e.g., computing device 410 can determine that it has exited geofence 430 when the previous entry state is "Entered" and the current entry state is "Not Entered". Upon exit from geofence 430, a geofence exit message can be generated. FIG. 4B shows that computing device 410 exits geofence 430 at point P2 and so geofence exit message 444 of "Hope you Circle Back Soon!" is generated for display by computing device 410.

IV. EXAMPLES OF METHODS

The above approach for geofencing involves accurately locating the computing device. Determining a location of the computing device can be accomplished using several techniques, including using a Global Positioning System (GPS) receiver in the computing device, as an example. Such location based actions of a computing device may use a significant amount of power. Therefore, it may be desirable to reduce the power drain of computing devices due to location based actions.

Figure 5:
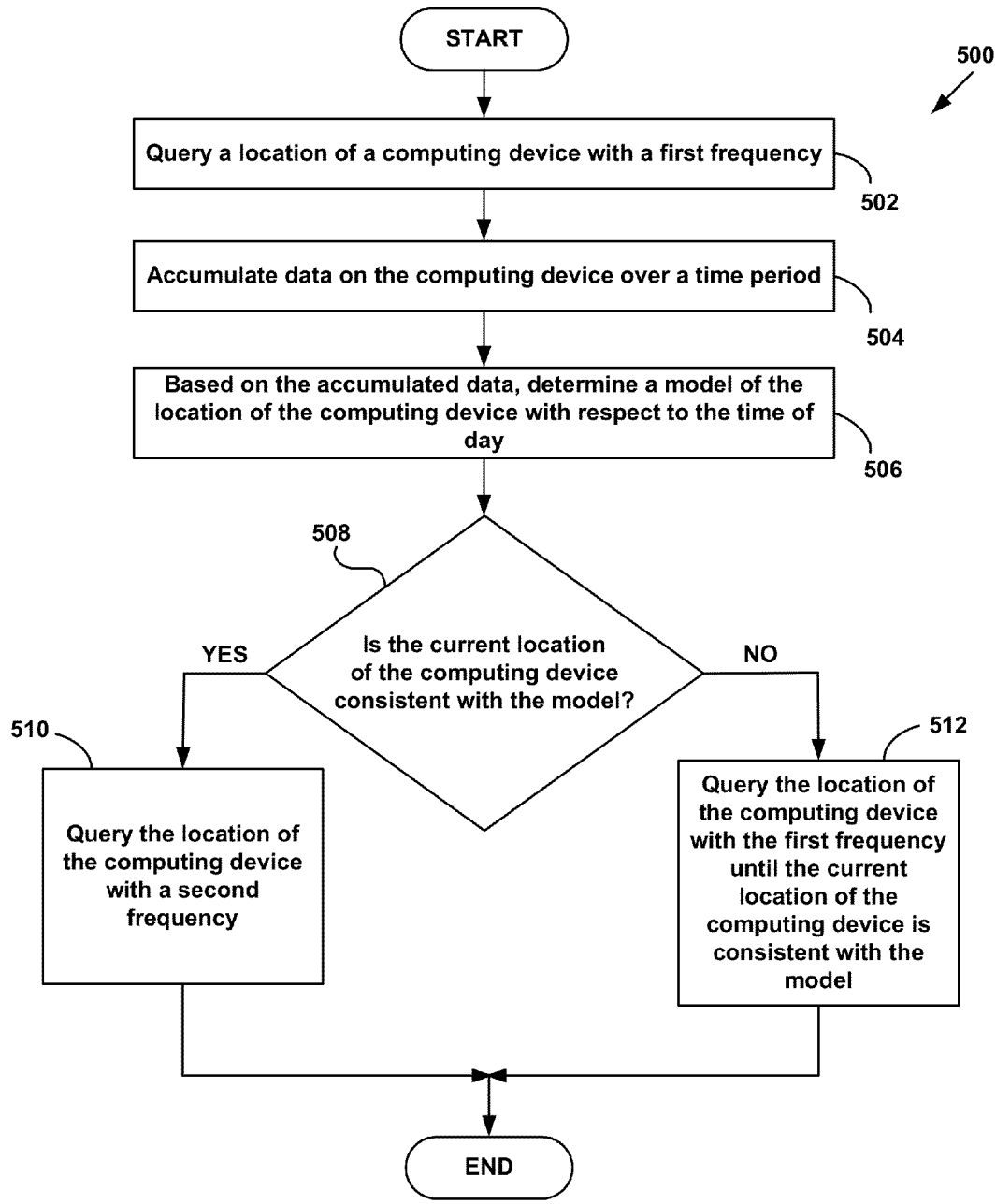
FIG. 5 depicts a flow chart, in accordance with an example embodiment.

FIG. 5 depicts a flowchart of an example method, which in some examples, may be performed by components of the computing device 200 in FIG. 2. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method shown in FIG. 5 will be described as implemented by a computing device, such as the computing device 200 in FIG. 2. It should be understood that other entities, such as one or more servers, can implement one or more steps of the example method.

At block 502, the method includes querying a location of a computing device with a first frequency. Querying a location of the computing device can be accomplished using several techniques. Example techniques include, but are not limited to, determining the location based on: a Global Positioning System (GPS) receiver in the computing device, input from a user of the computing device, based on information in the environment (e.g., street and highway signs), triangulation of network signals, use measurements from gyroscope(s) and accelerometer(s) in the computing device, and combinations of these techniques. Other techniques are possible as well. In one example, the first frequency is about every 2 minutes. In other words, the computing device may be configured to query the location of the computing device every two minutes. The first frequency may be a default frequency, meaning that the computing device will query its location with the first frequency unless the model recommends a second frequency based on user actions, as discussed below.

In one embodiment, querying the location of the computing device may include determining the location of the computing device with respect to a geofence. As discussed above, a geofence may comprise a virtual perimeter on a geographic area using a location-based service, so that a notification may be generated in response to the monitored computing device entering or exiting the area. In one embodiment, the method may also include detecting a breach of the geofence in response to detection that the computing device has entered or exited a region bounded by the geofence.

At block 504, the method includes accumulating data on the computing device over a period of time. In one embodiment, data is accumulated locally in the data storage of the computing device. In another embodiment, data is accumulated in the data storage of another computing device, such as a server. In one example, the period of time (hereinafter "training period") may be a month. Other periods of time are possible as well.

The accumulated data may include at least respective locations of the computing device during the training period with respect to a time of day, collected at increments based on the first frequency. For example, the computing device may query its location using a GPS receiver every two minutes during the training period. The reference data of the computing device may include activity logs determined based on the location of the computing device with respect to the time of day, and activity data determined based on comparisons made between stored activity logs. The activity data may represent a change in location by comparing subsequent activity logs. The activity data may include a counter module. The counter module may include a counter value indicative of a number of occurrences of a correlation between a location and a time of day. The counter module may be configured to increment the counter value based at least in part on the number of occurrences.

In another example, the data may further comprise information indicating the movement of the computing device with respect to the time of day. Movement of the computing device may be determined by one or more sensors, such as gyroscope(s) and/or accelerometer(s) located on the computing device. The reference data of the computing device may include activity logs determined based on the movement of the computing device with respect to the time of day, and activity data determined based on comparisons made between stored activity logs. The activity data may include a counter module with a counter value indicative of a number of occurrences of a correlation between a movement and a time of day. The counter module may be configured to increment the counter value based at least in part on the number of occurrences.

At block 506, the method includes determining a model of the location of the computing device with respect to the time of day based on the accumulated activity data.

For example, consider a user who takes his or her computing device everywhere during one working day. From 12:00 am-8:00 am, the computing device is at the residence of the user as the user sleeps. From 8:00 am-9:00 am the location of the computing devices changes as the user commutes to work. From 9:00 am-5:00 pm the computing device is at the user's worksite. From 5:00 pm-6:00 pm, the location of the computing device changes as the user commutes home from work. From 6:00 pm-12 am, the user's activities may vary by day, so the location of the computing device during this time period may be variable.

Using the example above, the computing device may develop a model during the training period to match the activity of the user. As described above in relation to block 504, the reference data of the computing device may include activity logs determined based on the location of the computing device with respect to the time of day, and activity data determined based on comparisons made between stored activity logs. Further, the activity data may include a counter module with a counter value indicative of a number of occurrences of a correlation between a location and a time of day. If the number of occurrences reaches a threshold number, that particular location with respect to the time of day may be added to the model. For example, since the user typically sleeps from 12:00 am-8:00 am, the counter module may count the number of times the computing device is at a particular location (e.g., the user's residence) at a particular time of day (e.g., between 12:00 am-8:00 am). If the correlation between the user's residence and a particular time of day exceeds a threshold, the location with respect to the time of day may be added to the model. Example thresholds values include 5, 10, 20, or more.

In another example, the model further includes a representation of the movement of the computing device with respect to the time of day. The representation of the movement of the computing device may be classified into different activity classes. For example, consider a user who takes his or her computing device everywhere during one working day. First, the computing device may be essentially stationary at home while the user prepares for his or her workday. Then, as the user travels to work, the computing device may be moving to the worksite, either in the possession of the user as the user walks to the worksite, or in a vehicle as the user commutes to the worksite. Depending on the user's tasks, the computing device may then be essentially stationary at an office, walk or run around a job site, and/or travel from place to place in a vehicle. Then, after work, the computing device may be taken home and remain stationary while the user sleeps. In this example, a classification of the activities of the computing device can include: (a) being stationary, (b) walking, (c) running, or (d) vehicular travel. The model may be representative of the times of day corresponding to when the computing device is stationary.

Using the example above, the computing device may develop a model during the training period that corresponds to the times of day when the computing device is stationary. As described above in relation to block 504, the reference data of the computing device may include activity logs determined based on the movement of the computing device with respect to the time of day, and activity data determined based on comparisons made between stored activity logs. Further, the activity data may include a counter module with a counter value indicative of a number of occurrences of a correlation between an activity class and a time of day. If the number of occurrences reaches a threshold number, that particular location with respect to the time of day may be added to the model. Example thresholds values include 5, 10, 20, or more.

In one example, the model may only be applicable during weekdays, since the user's schedule is more predictable during the week. In another example, the model may be distinct for each day of the week. For example, a user may have a first model for Mondays, Wednesdays and Fridays, and a second model for Tuesdays and Thursdays. Other examples are possible as well. The schedule of each particular user may determine the model for that user's computing device. Therefore, the training period should be a period of time long enough to establish particular patterns of activity for the user.

At block 508, the method includes determining whether the current location of the computing device is consistent with the model. The current location of the computing device at any given time may be determined by a GPS receiver in the computing device, as an example. The current location of the computing device may be compared to the model, which may be stored in the data storage of the computing device. In another embodiment, the current movement of the computing device may be compared with the model. The current movement of the computing device at any given time may be determined by one or more sensors, such as gyroscope(s) and/or accelerometer(s) located on the computing device. The current movement may then be compared to the model, which may be stored in the data storage of the computing device.

If it is determined that the current location and/or movement of the computing device is consistent with the model, the method continues at block 510 with querying the location of the computing device with a second frequency, where the second frequency is less than the first frequency. In one example, the second frequency is about every 15 minutes. In other words, if the current location is consistent with the model, the computing device may be configured to query the location of the computing device every 15 minutes, instead of every 2 minutes.

Using the example described above, the model may indicate that the computing device is typically at the user's residence from 12:00 am-8:00 am. Additionally, the model may indicate that the computing device is typically stationary from 12:00 am-8:00 am. Up until 12:00 am, the computing device may query its location with a first frequency (e.g., every 2 minutes, as an example). At 12:00 am, the computing device may determine its location. If the computing device determines that its location at 12:00 am is the user's residence (in other words, the current location is inconsistent with the model), then the computing device may query its location with a second frequency (e.g., every 15 minutes, as an example). In another example, the computing device may determine its location at the first frequency until the location is consistent. For example, the computing device may determine its location every 2 minutes until the location is consistent for five consecutive queries. At that time, the computing device may begin querying its location with the second frequency. Similarly, if the computing device determines that it is stationary at 12:00 am (in other words, the current movement is consistent with the model), and the current location is consistent with the location model, then the computing device may query its location with a second frequency. By reducing the number of times the computing device queries its location, the power drain on the battery of the computing device may be reduced.

If it is determined that the current location and/or movement of the computing device is inconsistent with the model, the method continues at block 512 with querying the location of the computing device with the first frequency until the current location and/or movement of the computing device is consistent with the model. In another example, if it is determined that the current location and/or movement of the computing device is inconsistent with the model, the computing device may disengage the model for a period of time (e.g., one day).

Using the example described above, the model may indicate that the computing device is typically at the user's residence from 12:00 am-8:00 am. Additionally, the model may indicate that the computing device is typically stationary from 12:00 am-8:00 am. Up until 12:00 am, the computing device may query its location with a first frequency (e.g., every 2 minutes, as an example). At 12:00 am, the computing device may determine its location. If the determined location of the computing device at 12:00 am is not the user's residence (in other words, the current location is inconsistent with the model), the computing device may continue to query its location with the first frequency until the current location of the computing device is consistent with the model. Similarly, if the computing device determines that it is moving at 12:00 am (in other words, the current movement is inconsistent with the model), then the computing device may continue to query its location with the first frequency until the current movement of the computing device is consistent with the model.

V. EXAMPLE COMPUTER-READABLE MEDIUM CONFIGURED TO ADJUST THE FREQUENCY OF QUERYING THE LOCATION OF A COMPUTING DEVICE DUE TO USER ACTIVITY

Figure 6:
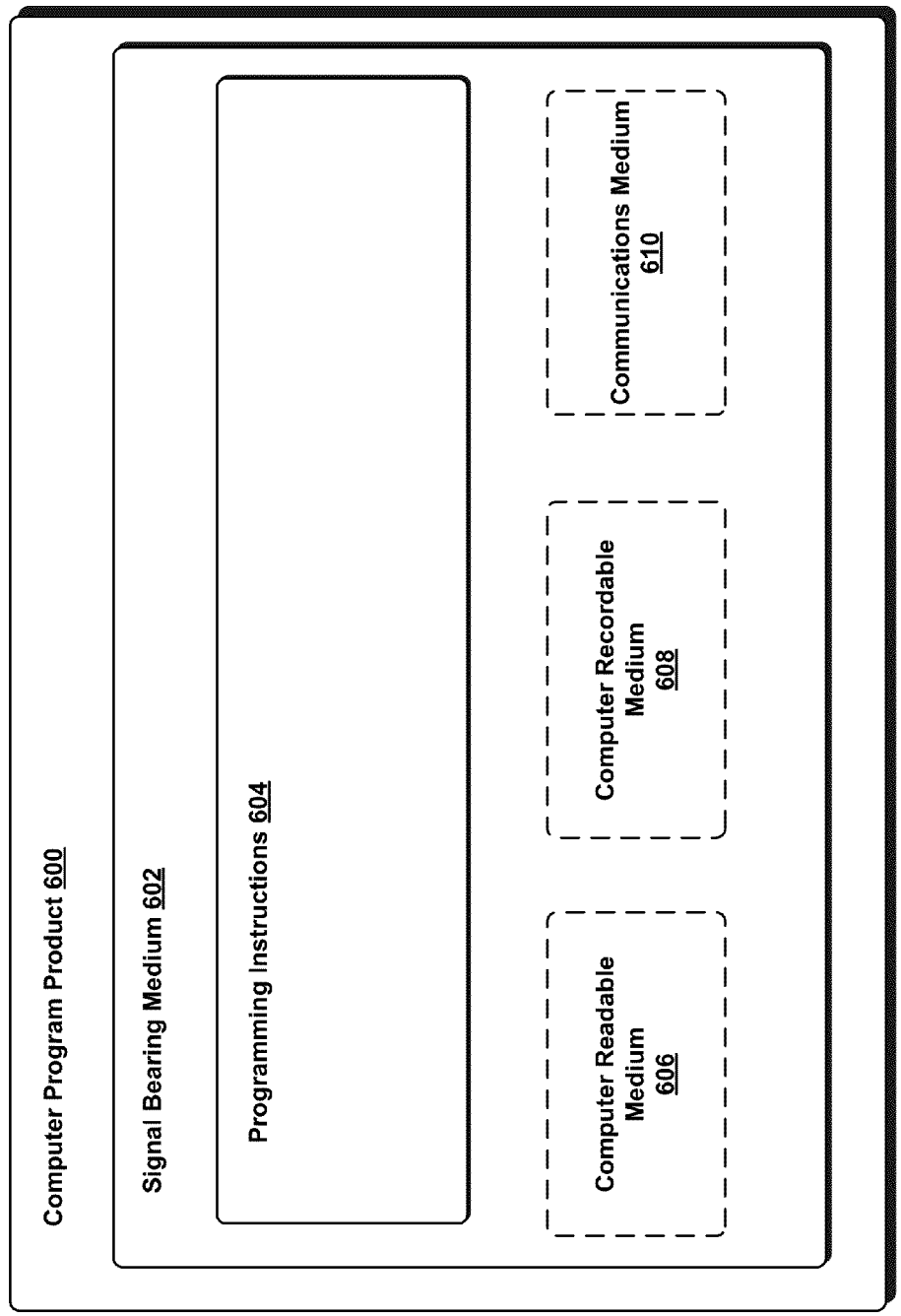
FIG. 6 depicts a computer-readable medium configured according to an example embodiment.

FIG. 6 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 can be a computer-readable medium 606, such as, but not limited to, a hard disk drive, a Compact Disc (CD), a Digital Video Disk (DVD), a digital tape, memory, etc. In some implementations, the signal bearing medium 602 can be a computer recordable medium 608, such as, but not limited to, memory, read/write (R/W) CDs, R/W DVDs, etc. In some implementations, the signal bearing medium 602 can be a communications medium 610, such as, but not limited to, a digital and/or an analog communication medium (e.g., a fiber optic cable, a waveguide, a wired communications link, a wireless communication link, etc.). Thus, for example, the signal bearing medium 602 can be conveyed by a wireless form of the communications medium 610.

The one or more programming instructions 604 can be, for example, computer executable and/or logic implemented instructions. In some examples, a computing device such as the processor 206 of FIG. 2 is configured to provide various operations, functions, or actions in response to the programming instructions 604 conveyed to the processor 206 by one or more of the computer-readable medium 606, the computer recordable medium 608, and/or the communications medium 610.

The non-transitory computer-readable medium could also be distributed among multiple data storage elements, which could be remotely located from each other. The device that executes some or all of the stored instructions could be a client-side computing device 200 as illustrated in FIG. 2. Alternatively, the device that executes some or all of the stored instructions could be a server-side computing device.

VI. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A computer-implemented method comprising:
   querying, via a communication interface of a computing device, a location of the computing device with a first frequency;
   accumulating data on the computing device over a time period, wherein the data comprises at least (i) respective locations of the computing device during the time period with respect to a time of day, and (ii) information identifying a movement of the computing device with respect to the time of day;
   based on the accumulated data, the computing device determining a model of the location and movement of the computing device with respect to the time of day;
   comparing, by the computing device, a current location of the computing device, a current movement of the computing device, and a current time of day to the model;
   if the comparison indicates that both (i) the current location of the computing device with respect to the current time of day is consistent with the model and (ii) the current movement of the computing device with respect to the current time of day is consistent with the model, then querying, via the communication interface of the computing device, the location of the computing device with a second frequency, wherein the second frequency is less than the first frequency; and
   if the comparison indicates that either (i) the current location of the computing device with respect to the current time of day is inconsistent with the model or (ii) the current movement of the computing device with respect to the current time of day is inconsistent with the model, then querying, via the communication interface of the computing device, the location of the computing device with the first frequency until the current location is consistent with the model.

2. The method of claim 1, wherein the first frequency is about every 2 minutes.

3. The method of claim 1, wherein the second frequency is about every 15 minutes.

4. The method of claim 1, wherein querying a location of a computing device comprises determining the location of the computing device with respect to a geofence.

5. The method of claim 4, further comprising:
   detecting a breach of the geofence in response to detection that the computing device has entered or exited a region bounded by the geofence.

6. The method of claim 1, further comprising:
   if the comparison indicates that both (i) the current location of the computing device with respect to the current time of day is inconsistent with the model and (ii) the current movement of the computing device with respect to the current time of day is inconsistent with the model, then querying, via the communication interface of the computing device, the location of the computing device with the first frequency until the current location is consistent with the model.

7. The method of claim 1, wherein the information identifying a movement of the computing device with respect to the time of day comprises information indicating the computing device is stationary.

8. A computing device comprising:
   a communication interface;
   at least one processor;
   data storage comprising program logic, that when executed by the at least one processor, cause the computing device to perform functions comprising:
     querying, via the communication interface of the computing device, a location of the computing device with a first frequency;
     accumulating data on the computing device over a time period, wherein the data comprises at least (i) respective locations of the computing device during the time period with respect to a time of day, and (ii) information identifying a movement of the computing device with respect to the time of day;
     based on the accumulated data, determining a model of the location and movement of the computing device with respect to the time of day;
     comparing a current location of the computing device, a current movement of the computing device, and a current time of day to the model;
     if the comparison indicates that both (i) the current location of the computing device with respect to the current time of day is consistent with the model and (ii) the current movement of the computing device with respect to the current time of day is consistent with the model, then querying, via the communication interface of the computing device, the location of the computing device with a second frequency, wherein the second frequency is less than the first frequency; and
     if the comparison indicates that either (i) the current location of the computing device with respect to the current time of day is inconsistent with the model or (ii) the current movement of the computing device with respect to the current time of day is inconsistent with the model, then querying, via the communication interface of the computing device, the location of the computing device with the first frequency until the current location is consistent with the model.

9. The computing device of claim 8, wherein querying a location of a computing device comprises determining the location of the computing device with respect to a geofence.

10. The computing device of claim 9, wherein the program logic is further executable by the at least one processor to carry out the function of:
   detecting a breach of the geofence in response to detection that the computing device has entered or exited a region bounded by the geofence.

11. A non-transitory computer-readable storage medium having stored thereon instructions, that when executed by a computing device, cause the computing device to carry out functions comprising:
   querying, via a communication interface of the computing device, a location of the computing device with a first frequency;
   accumulating data on the computing device over a time period, wherein the data comprises at least (i) respective locations of the computing device during the time period with respect to a time of day, and (ii) information identifying a movement of the computing device with respect to the time of day;
   based on the accumulated data, the computing device determining a model of the location and movement of the computing device with respect to the time of day;
   comparing, by the computing device, a current location of the computing device, a current movement of the computing device, and a current time of day to the model;
   if the comparison indicates that both (i) the current location of the computing device with respect to the current time of day is consistent with the model and (ii) the current movement of the computing device with respect to the current time of day is consistent with the model, then querying, via the communication interface of the computing device, the location of the computing device with a second frequency, wherein the second frequency is less than the first frequency; and
   if the comparison indicates that either (i) the current location of the computing device with respect to the current time of day is inconsistent with the model or (ii) the current movement of the computing device with respect to the current time of day is inconsistent with the model, then querying, via the communication interface of the computing device, the location of the computing device with the first frequency until the current location is consistent with the model.

12. The non-transitory computer-readable storage medium of claim 11, wherein querying a location of a computing device comprises determining the location of the computing device with respect to a geofence.

13. The non-transitory computer-readable storage medium of claim 12, wherein the functions further comprise:
   detecting a breach of the geofence in response to detection that the computing device has entered or exited a region bounded by the geofence.

\* \* \* \* \*